United States Patent [19]
Lee

[11] Patent Number: 5,422,959
[45] Date of Patent: Jun. 6, 1995

[54] SIGNATURE VERIFICATION APPARATUS AND METHOD UTILIZING RELATIVE ANGLE MEASUREMENTS

[76] Inventor: Michael E. Lee, 243 Susan St., Eugene, Oreg. 97404

[21] Appl. No.: 83,716

[22] Filed: Jun. 25, 1993

[51] Int. Cl.$^6$ .............................................. G06K 9/00
[52] U.S. Cl. ................................... 382/119; 382/313; 73/865.4
[58] Field of Search ............................ 382/3, 13, 59; 73/432 KS, 432 A, 865.4, 1 E; 358/478; 178/19; G06K 9/00; H04N 1/024; G08C 21/00; G01F 15/14; 364/558, 566

[56] References Cited

U.S. PATENT DOCUMENTS

| | | | |
|---|---|---|---|
| 3,528,295 | 9/1970 | Johnson | 73/432 |
| 3,906,444 | 9/1975 | Crane | 340/146.3 SY |
| 3,983,535 | 9/1976 | Herbst | 340/146.3 SY |
| 3,986,403 | 10/1976 | Hurd | 73/432 R |
| 4,078,226 | 3/1978 | EerNisse | 340/146.3 SY |
| 4,111,052 | 9/1978 | Sniderman | 73/432 R |
| 4,128,829 | 12/1978 | Herbst | 340/146.3 SY |
| 4,131,880 | 12/1978 | Siy | 340/146.3 SY |
| 4,142,175 | 2/1979 | Herbst | 340/146.3 SY |
| 4,190,820 | 2/1980 | Crane | 340/146.3 SG |
| 4,286,255 | 8/1981 | Siy | 340/146.3 SY |
| 4,344,135 | 8/1982 | Crane | 364/419 |
| 4,513,437 | 4/1985 | Chainer | 382/3 |
| 4,553,258 | 11/1985 | Chainer | 382/3 |
| 4,646,351 | 2/1987 | Asbo | 382/3 |
| 4,724,542 | 2/1988 | Williford | 382/3 |
| 4,736,445 | 4/1988 | Gunderson | 382/3 |
| 4,789,934 | 12/1988 | Gunderson | 364/419 |
| 4,896,543 | 1/1990 | Gullman | 73/862.04 |
| 5,022,086 | 6/1991 | Crane et al. | 382/3 |
| 5,054,088 | 10/1991 | Gunderson | 382/3 |
| 5,109,426 | 4/1992 | Parks | 382/3 |
| 5,111,004 | 5/1992 | Gullman | 178/18 |
| 5,165,102 | 11/1992 | Sawyer | 382/3 |

Primary Examiner—Yon J. Couso
Attorney, Agent, or Firm—Marger, Johnson, McCollom & Stolowitz

[57] ABSTRACT

A signature verification system consisting of a durable pressure sensitive data input stylus, signal processing, and computer algorithms for enrollment of signatures and verification. The stylus contains two transducers placed so that axial force and lateral force are measured simultaneously. Combining the two signals at digitized sample points yields a ratio of pressures indicative of the angle of the stylus to the writing surface at that moment, controlling for variations in actual force. The ratio, called a relative angle, is calculated for the entire signal train of a signature and for various simple divisions, or segments. Segments are equal divisions of the signal train by various divisions. While the relative angle of the whole signature may vary unpredictably between signings, the unique variations around the average relative angle form unique signature discriminates. Variations are measured by comparing relative angle measurements of segments, one to another, in all mathematical combinations. The combinations are called measurement points and each measurement point has a value based on the comparison. Some measurement point values, out of many sampled by computer, are uniquely consistent for particular signers. These unique measurement points and their limited ranges of variation are determined during enrollment and become the signature discriminates. These signature discriminate measurement points and values electronically distinguish an enrolled signer. Verification is simplified by comparing only chosen reference measurements to determine if the incoming values fall within the acceptable range of values. An easily adjustable score determines rejection or acceptance of a signature to be verified.

27 Claims, 7 Drawing Sheets

SIGNATURE VERIFICATION APPARATUS AND METHOD UTILIZING RELATIVE ANGLE MEASUREMENTS

BACKGROUND—FIELD OF THE INVENTION

The present invention is concerned with an apparatus and a method for comparing a sample signature with reference signature characteristics, and more particularly a low-cost stylus for use with algorithms that accurately and rapidly identify individuals.

BACKGROUND—DESCRIPTION OF PRIOR ART

For many years significant efforts have been made to develop systems that reliably establish the identity of a person. Such systems are deemed desirable from the point of view of both the identifier and the identified in a variety of settings. Some uses for identify verification systems include: credit card transactions, access to computer programs and information, electronic funds transfer, and the electronic transmission of legal documents and signatures. In these types of situations identity verification must be inexpensive, reliable, and non-intrusive.

Many proposed systems measure some biological trait unique to the individual. Reference measurements are taken and stored for comparison later at the time of verification. For example, there exist systems using voice recognition, palm print recognition, and laser retinal scans. These systems have achieved some success in terms of reliability and utility in restricted situations. Retinal scanners are used in some prisons and high security areas in government and industry. However, the public perception of intrusiveness has kept such systems from widespread applications in everyday transactions. Complexity of the systems and costs have also slowed development and implementation.

Identity verification by means of written signatures, electronically recorded, has long been known, in spite of significant shortcomings. One advantage of systems using the familiar signature and pen is that intrusiveness is not considered a problem. The signature is commonplace and expected in everyday financial transactions and as a means of general identification. Also, a major advantage of signatures as identification is the unique role that the signature plays in human affairs. The signature of ink on paper has been, and continues to be, the quintessential mark of business. No substitute for the signature is likely to be developed. Contracts, credit card slips, and checks become legal, once signed. The requirement of legal signatures on documents increasingly causes a bottleneck when the rest of the information and documentation is transmitted electronically.

Dynamic signature verification typically records the various pressures, velocities, accelerations, and directions of writing by means of transducers or accelerometers housed in a special pen or writing plenum. Reference signatures are acquired during an enrollment process. The electronic signals from the reference signatures are analyzed and stored for comparison to offered signatures during a verification transaction.

Dynamic signature verification systems should be distinguished from systems designed just to capture a signature and replicate it later without verification. Also, plenum (or pad-based) systems which house electronic devices in the writing pad rather than the pen itself should be distinguished.

The system described herein consists of a stylus (pen) containing pressure sensing transducers, a unit for amplifying, digitizing, sampling, storing, and transmitting these signals via phone. Finally, algorithms are developed for the analysis of the specific and unique type of signals sent by the data input stylus. Special algorithms are developed for the processing of signal trains from signatures for enrollment of reference signatures and the verification of sample signatures.

PRIOR ART

Known in the art of dynamic signature verification are a variety of pens (styli) containing electronic sensing means designed to measure some combination of dynamics such as pressure, acceleration, velocity, or direction produced while signing a signature.

U.S. Pat. No. 3,528,295 issued Sep. 15, 1970 to Johnson et al., is an early version of a data input stylus. Disclosed is a pen containing pressure responsive transducers mounted therein. In the first, relatively simple embodiment of the stylus, a single transducer is provided for measuring downward (z-axis) pressure.

In a more sophisticated embodiment of U.S. Pat. No. 3,528,295 four additional transducers are provided which are oriented in an orthogonal relationship to provide information in two additional axis (x and y directions). During writing signals would then be generated corresponding to the pressures exerted in the left to right directions on the plane, or paper (x-axis), far to near (y-axis), and downward (z-axis, sometimes called "p" for pressure downward).

Subsequent work continued to rely on the three axis model using varieties of dynamics along one, two, or all three axis. Obtaining unambiguous readings on the x-y plane (that is, distinguishing x signals from y signals on the plane) was problematic since it required that the pen be held in the same way and not rotated in the hand between signatures.

U.S. Pat. No. 3,906,444 issued Sep. 16, 1975 to Crane et al., demonstrates a pen shaped in such a way as to be held in only one correct way when signing. The output signals represent the direction that the pen is moved, which is converted into direction per unit of time.

U.S. Pat. No. 3,986,403 issued Oct. 19, 1976 to Hurd et al., measures pressures along the x, y, and z (also called "p" for pressure) axis using a number of strain gages. This pen is also designed to be held in a particular way.

U.S. Pat. No. 4,078,226 issued Mar. 7, 1978 to Eer-Nisse et al., measures pressure forces proportional to the acceleration of the writing tip (muscle movements) distinguishing x and y forces. In one embodiment a pressure sensitive writing surface utilizing piezoelectric transducers is provided to produce an output representing the z (pressure downward) force.

U.S. Pat. No. 4,513,437 issued Apr. 23, 1985 to Chainer et al., is designed to measure acceleration along the x,y axis. That is, the orthogonal forces lying essentially in a plane perpendicular to the pen axis. The remaining axis, z (or pressure) is measured with a pressure transducer.

U.S. Pat. No. 4,896,543 issued Jan. 30, 1990 to Gullman discloses a three-axis force measurement stylus designed to generate an electrical signal representing the force applied in the direction of motion taken in writing. Strain gages are used to sense force in three dimensions (along three axis).

U.S. Pat. No. 5,111,004 issued May 5, 1992 to Gullman contains a series of sensor portions in a PZT annulus which is designed measure and distinguish pressure applied along the three distinct axis, x, y, and z.

Also known in the art are a number of methods of analysis or algorithms designed to analyze the incoming signals of a data input stylus to determine if the sample signature under consideration matches the reference signature data on file.

U.S. Pat. No. 3,983,535 issued Sep. 28, 1976 to Herbst et al., also has as a preferred embodiment input device a tablet, or plenum, which allows unambiguous x and y signals on a plane. This method is based on the theory that accelerations of the stylus, which are proportional to the muscle forces exerted by the signer, are of predetermined consistent durations when forming particular strokes. The nature of the process gives rise to various distortions in the time axis: e.g. pauses between sections of the name, skipped strokes, decorative rubrics, etc. Thus the signal is marked by regions of high correlation of unknown duration separated by variable regions of low correlation. Accordingly, the invention deals with a method of regional correlation which attempts to register these regions, at first based on stylus contact (segmentation), shift them individually to find the maximal of a correlation function.

U.S. Pat. No. 4,128,829 issued Dec. 5, 1978 also to Herbst et al. is an improvement of U.S. Pat. No. 3,983,535. While U.S. Pat. No. 3,983,535 was based on a single acceleration parameter of the signature dynamic, U.S. Pat. No. 4,128,829 uses two orthogonally disclosed (x and y axis) acceleration components along with pressure patterns (z axis).

The x, y, and z components must be processed in complex format and combined to form a complex correlation wherein the correlation magnitude is utilized for subsequent decision purposes.

The pen required would have x and y accelerometers along with the ability to measure the pressure signal with some sort of axially mounted pressure sensitive transducer mounted in the pen. The preferred pen would need to be un-oriented (not shaped to it was required to be held in a particular way to orient the accelerometers). Thus the analysis system is required to mathematically rotate the signals produced in order to obtain unambiguous x and y data.

U.S. Pat. No. 4,128,829 by Herbst requires a large amount of highly specialized and complex hardware. The operation of U.S. Pat. No. 4,128,829 must utilize an overall segmentation and relative shifting scheme as taught in Herbst U.S. Pat. No. 3,983,535. The system also requires pens having consistent characteristics for measurement. Finally, the criteria cut-off levels for accept or reject are based on empirical statistical results partially based on large population testing bases.

U.S. Pat. No. 4,553,258 issued Nov. 12, 1985 to Chainer et al., uses acceleration and pressure signals but is reliant on segmentation of signal trains based on pen-up and pen-down times.

U.S. Pat. No. 4,738,445 issued Apr. 5, 1988 by Gunderson et al., is a signature verification system utilizing a pen input device described in U.S. Pat. No. 4,813,437 which uses bimorph piezoelectric transducers which produce electrical signals in response to the rate of change of axial pressure on the pen and acceleration of the pen. This patent retains work done in U.S. Pat. No. 4,128,829, mentioned above, regarding the necessity of segmentation based on pen lifts and correlations calculations.

The similarity measure developed to accept or reject signatures uses a set of parameters that depend upon the normalized distributions of the input measures for a general population of users. And peior methods have relied upon existing data input styli or devices, limiting innovation.

Problems can be summarized as follows:

1. Signature verification systems begin at a data pickup point, either a stylus or a pressure pad. The requirement of distinguishing the "x" direction on the plane from the "y" direction causes a number of problems. One solution is to employ a pad as a pickup device so the "x" and "y" coordinates are more clearly separated.

In the development of data input pens an early requirement was that the pen be held in a particular way so as not to confuse the "x" and "y" measurements. Later, "mathematical rotation" of the data was substituted for the rotation of the pen, but the problems of complexity remained.

In order to make the precise differentiations required, the pens developed tended to be composed of delicate and sensitive parts, not easily calibrated, that were quite expensive. Making the pen durable and sensitive has been a problem.

2. The data produced by prior art data input pens (styli) is complex and has no clear analogy to a measured phenomenon. Often, population parameters are included in an attempt to bring logic to complex data resulting from the variation of signals coming in from three dimensions (x, y, and z). The complexity is compounded when additional calculations are used to convert speed into acceleration measures, or when absolute measures are employed.

3. Prior art signature verification analysis relies on the segmentation of the signature into signal parts based on pen lifts and pen-down times on the paper. Such segments are natural, but their variation from signature to signature of the same signer causes extreme complexity in allowing for, and correcting, such segment variation.

4. Finally, the accuracy of prior art systems is a problem. False rejections, based on a true signer being rejected for variations are not only most common, but provide most of the problems in practice. The algorithms developed are not easily tuned to the individual registrant and not easily changed to meet changing conditions.

OBJECTS AND ADVANTAGES

The disadvantages and obstacles in the prior art are overcome in the invention disclosed herein, by taking advantage of a fundamentally different stylus (data input pen) device. The data collection device allows the verification data to be collected and treated in fundamentally new ways in signature verification enrollment and verification algorithms.

Accordingly, several objects and advantages of my invention are:

First, that a fundamentally different stylus is disclosed that measures a new signature dynamic called the relative angle. Measurements are made of the variations around the relative angle of the signer. To measure the relative angle and the resulting variations around the angle, a new stylus design is incorporated with the following advantages, a. The orientation of the pen on the writers hand (the rotation of the pen) is irrelevant to the measurements taken. Thus, the pen need not be shaped in a particular way nor the measurements manipulated or mathematically rotated later.

b. The measurements taken are simpler than those measured on a three axis model since the x and y axis are not differentiated, and only a ratio is needed to calculate the relative angle.

c. The resulting pen is more durable and less sensitive than those utilizing delicate electronic equipment. The measurements derived are relative to one another and absolute accuracy is not required to as great a degree.

d. The resulting stylus is less expensive and more durable since just two simple transducers are used to arrive at a ratio measurement.

e. Calibration is not necessary, nor any fine adjustments to components of the stylus.

A further fundamental difference and advantage is that the resulting measurements taken allow a simplified and more useful enrollment and verification method (algorithm). The disclosed algorithms have the following advantages:

a. The measurements taken are based on a concrete analogy to the physical reality of dynamic signature measurement. The relative angle is "like" the actual angle of the pen in relation to the surface of the paper. The simple ratio of direct pressure to lateral pressure on the stylus is the measurement definition of relative angle. This analogy allows for data reduction which is necessary for simplicity. Also, complex correlations without analogy are avoided as a method of verification.

b. The disclosed enrollment algorithm is more easily fine-tuned to the parameters of the individual signature. This allows more accuracy and the reduction of Type I (false rejection) and Type II errors (false acceptance) in verification. Also, there is no reliance on population parameters of signatures so probability plays a lesser role in verification.

c. The analysis of the data in the algorithms does not use segments based on pen-up and pen-down times. Segments used are simple divisions of the signal train which relativizes the duration of the signals and provides simple measurement points.

d. The increasingly higher calculation speeds of computers is taken advantage of to measure large numbers of measurement points based on the relative angle of a signature. The selection of just the most consistent from these large numbers tailors the enrollment to the true signer, and allows continual simple adjustments to be made to the signature discriminate measures.

e. Verification time is greatly reduced once enrollment is established since the algorithm examines only at assigned measurement points from the flood of incoming data.

f. The signature discriminates resulting are not extremely complex correlations, but rather highly individualized simple measures derived from the relative angle measures.

g. The verification criterion are easily updated to reflect changes in the way a signature is signed over time. Also, the signature stringency scores, the score of matched points that must be attained for verification, can be easily adjusted to meet a variety of changing conditions.

DRAWING FIGURES

In the drawings, closely related figures have the same number but different alphabetic suffixes.

REFERENCE NUMERALS IN DRAWINGS

Figure 1:
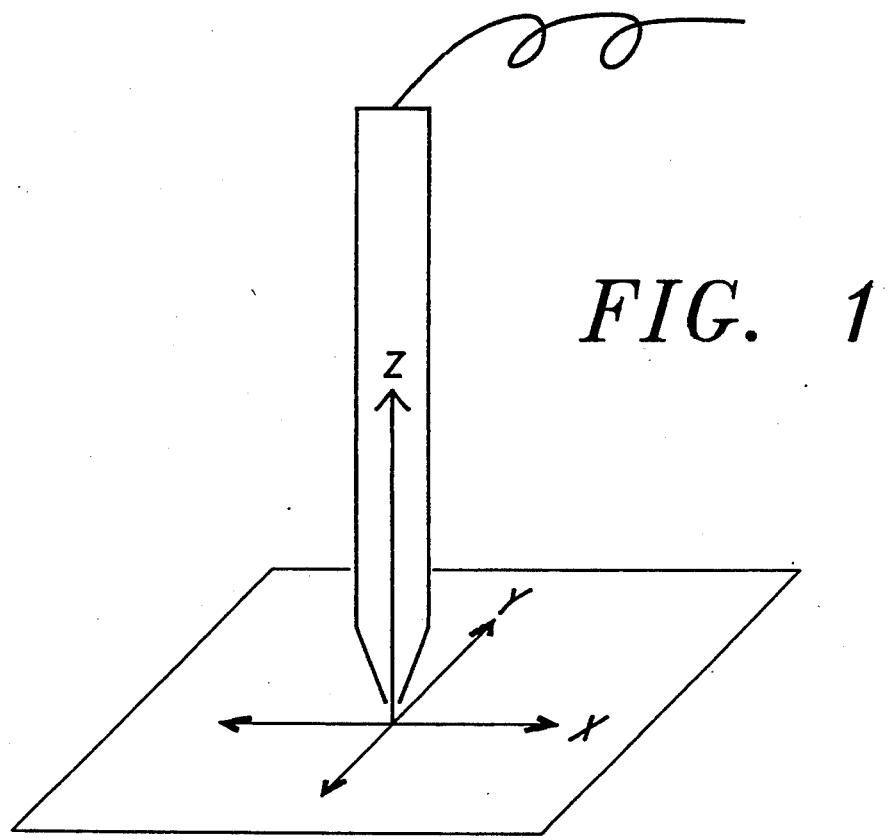
FIG. 1 shows vector forces measured in prior art.

30 Stylus vector diagram
32 Downward force of handwriting
34 Pressure relay tip
36 Direct pressure vector
38 Lateral pressure vector
40 Relative angle
42 Electrical lead wires
50 Data input stylus
52 Stylus writing tip
54 Stylus tip opening
56 Stylus nose piece
58 Lateral pressure transducer
60 Stylus cartridge
62 Retainer ring
63 Plunger stop ring
64 Direct pressure plunger piece
66 Direct pressure transducer
68 Retainer plug
70 Stylus housing
72 Empty section of stylus
74 Transducer transmission wires
76 Stylus transmission tether wires
78 Vector force diagram
90 Direct pressure signal train input
92 Lateral pressure signal train input
94 Direct pressure amplification
96 Lateral pressure amplification
98 Power pack
100 Analog/Digital converter (sampler)
102 Computer memory
104 Microprocessor/sequencer
105 Computer storage
106 Modem
108 Microcomputer
110 Phone transmission link
130 Signal processing for enrollment
132 Begin enrollment (signal from central)
134 Signal trains received at central computer
136 "D" and "L" amplitude recorded
138 Ratio of "D" and "L" at each sample point
140 Define signal train segments
142 Calculate relative angle of segments and whole
144 Compare relative angle of segments (measurement points)
146 Calculate difference in relative angle of segments
148 Repeat above procedures for all signal trains
150 List measurement point values from all signal trains
152 Calculate range of values at each measurement point 154 Select least-range measurement points
156 Tentative measurement point discriminate selection
158 Test tentative measurement points
160 Adjust discriminates if necessary
162 Assign discriminates
164 End enrollment process
180 Verification signal processing
182 Extract measurement point values from signal train
184 Compare reference measurement point values to sample signature measurement point values.
186 Add total matches
188 Determine if score is above stringency cutoff
190 Determine if score is below stringency cutoff
192 Send accept message (if above stringency)
194 Send reject message (if below stringency)
210 Relative angle
212 Lateral pressure percentage
214 Direct pressure percentage
216 Quadrant segments
218 Decimated segments
220 Percentage of duration
222 Sample points, relative angle
224 Relative angle average line
226 Sample point variation around average
228 Pen up sample points

DESCRIPTION—FIGS. 1 TO 7

Before proceeding with the detailed description of the operation of the actual hardware and software of the present invention there will follow a brief description of the theoretical basis for the invention and a description of the forces which the system senses and analyzes.

The method of data collection and method of analysis of the present system is based on my work with actual writing instruments and the forces and pressures present when writing. Unlike prior art conceptualizations of three axis (dimensions) of motion and force in dynamic signature analysis, the present system is based on two basic pressures exerted on the stylus while writing. Prior art conceptualizations of the measurements possible with the stylus are indicated in FIG. 1. Prior theories were based on muscle pressures exerted through the stylus causing variations in downward pressure (z forces), and variations in directions, velocity, or acceleration along the x,y axis of the plane.

Figure 2:
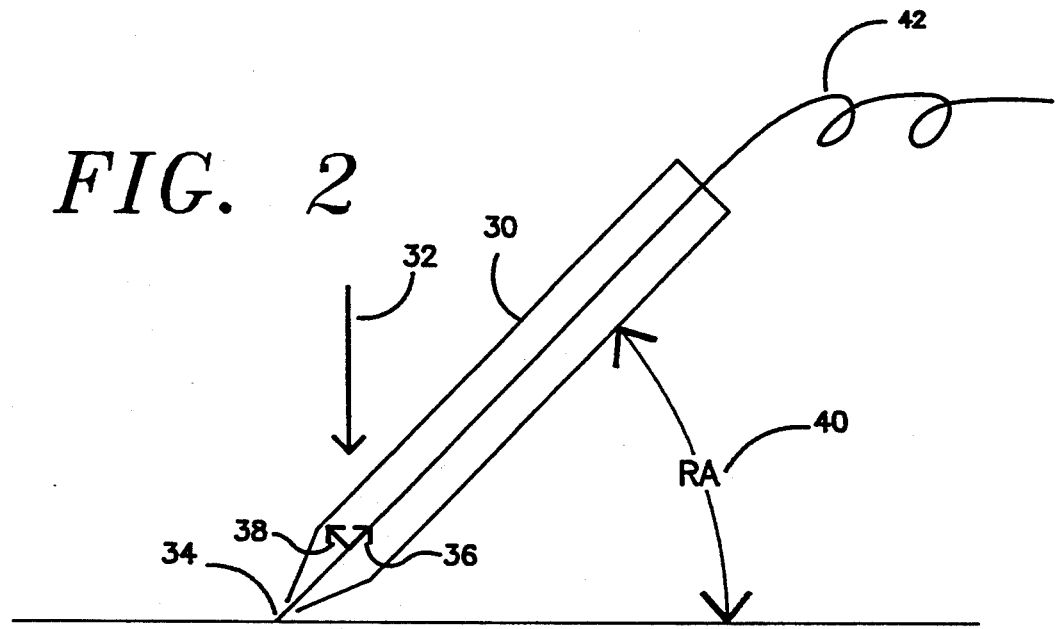
FIG. 2 shows the direct and lateral pressures and their relationship as a relative angle in the present invention.

In contrast, FIG. 2 indicates the forces and resulting pressures measured in a fundamentally different way in the present invention. The downward force of handwriting 32 through the stylus 30, caused by hand muscle pressure is, at any given point in time, a simple downward force absorbed at pressure relay tip 34. Other writing dynamics may be present, such as the direction or acceleration of the stylus, but these dynamics are not measured in the present invention. At a given moment (a digitized sample point) during a signature the downward force of writing is absorbed by the pen starting at the pressure relay tip 34, in two fundamental and measurable ways. First, there is a direct pressure 36 which is the axial, plunger-like force produced in the stylus. Secondly, a lateral pressure 38 is produced because the pen is used at an angle to the writing surface, and because writing takes place from left to right moving the pen along in a lateral direction.

The two basic forces or pressures, added together, equal the total force. Importantly, the two forces present are not used as variables individually, but rather form a single measure based on their ratio, and the variation in that ratio. The two pressures, measured by transducers, produce electrical signals relayed for processing and analysis by electric lead wires 42. Measurements are more static than dynamic, as the ratio is measured at individual sample points based on the digitization of the data. These basic measures form the building blocks for the analysis of the variation of the ratio throughout the signature, and are manipulated to define unique signature discriminates for verification.

The ratio of the two basic pressures can be conceptualized and visualized as an angle 40 of the stylus to the writing surface. The ratio of lateral pressure 38 to direct pressure 36 indicates the angle of the pen to the surface which is known as the relative angle 40, or "RA". As the angle of the pen becomes more perpendicular to the writing surface when pressure is applied, the relative direct pressure increases and the relative lateral pressure decreases. This relationship of direct and lateral pressure is reversed as the pen angle becomes more horizontal to the writing surface. The two pressures are measured in a stylus (FIG. 3) designed to measure the inverse correlation. As in any ratio relationship the actual total pressure and variations in gross pressure is held as a constant. The measurements are indicators of angle, not necessarily precise measurement of angle, since angle measurement, in itself, is not a goal of the invention.

This theory of analysis, based on lateral and direct pressures and the variations of their ratios during a signature, has an analogy which is helpful in visualizing the process. The analogy is that of a motion picture film taken of the hand and pen during the signing of a signature. If a camera took twenty frames per second and the signature lasted five seconds, the film could be made into one hundred still photographs of the signing.

These hundred photographs represent the digitization of the signal coming from the pen. They are static snapshots in time, like a digital sample of electronic signals. If the photos were laid out in order, some information about the signature would be available and some would not. The photographs would reveal the angle of the pen to the writing surface at each point in time, and would reveal the total time as the sum of the photos. Exact measurement of time and amplitude are only used for conversion to ratio relationships, however. Duration and amplitude are only finally measured in a relative way for analysis.

The photos provide limited information about the signature. But in this case using less information is not a hinderance, but rather, a desired advantage. Advanced artificial intelligence computer algorithms make use of the concept of data reduction by analogy. Maximal data collection is not attempted in favor of useful data collection based on a concrete analogy. This technique is aided by the increasing speed of computers which allow many calculations using the specifically limited data.

Continuing the analogy of the hundred photographs, the stylus angle in each photo could be measured with a protractor and the angle to the writing surface noted. When all the photos were so measured the average angle for the entire signature could be determined. This measure, called herein the relative angle average, is itself a variable since the same person could write at different angles depending on the desk height or other environmental conditions. The critical measurement is not the overall average relative angle, but the specific and unique variations around the relative angle which take place while signing a signature. The particular variations around the overall average relative angle are quantified by examining ratio relationships within in the signature, specifically between segments of the signature signal train. These variations I call measurement point values, which are also relative measures, not absolute.

The analysis performed here makes use of a technique known in the art as segmentation. That is, dividing the signature signal trains into parts for analysis. But segmentation is used here in a fundamentally different way. Much prior art segmentation has to do with the detection and definition of segments occurring as the stylus is lifted off the paper when signing, thus creating a series of natural segments of pen-down times. This method has caused great amounts of increasing complexity since signers naturally vary their signatures in ways that could change the segment count. For example, not dotting an "i" could change the entire segment profile.

Segmentation of signature signal trains is useful for analysis, but it can be more easily accomplished in the present system by simply dividing the total signal into ten equal parts. Similarly, additional segments can be created by dividing the signal into any number of equal parts. Signal trains can be divided into four equal parts, one hundred equal parts, or twenty five equal parts, and so forth. It will be obvious that this method standardizes the duration of the signal, making actual durations irrelevant. Also, since segment comparisons are used for analysis, it is apparent that only a small number of segmentations are necessary to provide large numbers of mathematical combinations of segments for analysis.

Figure 7:
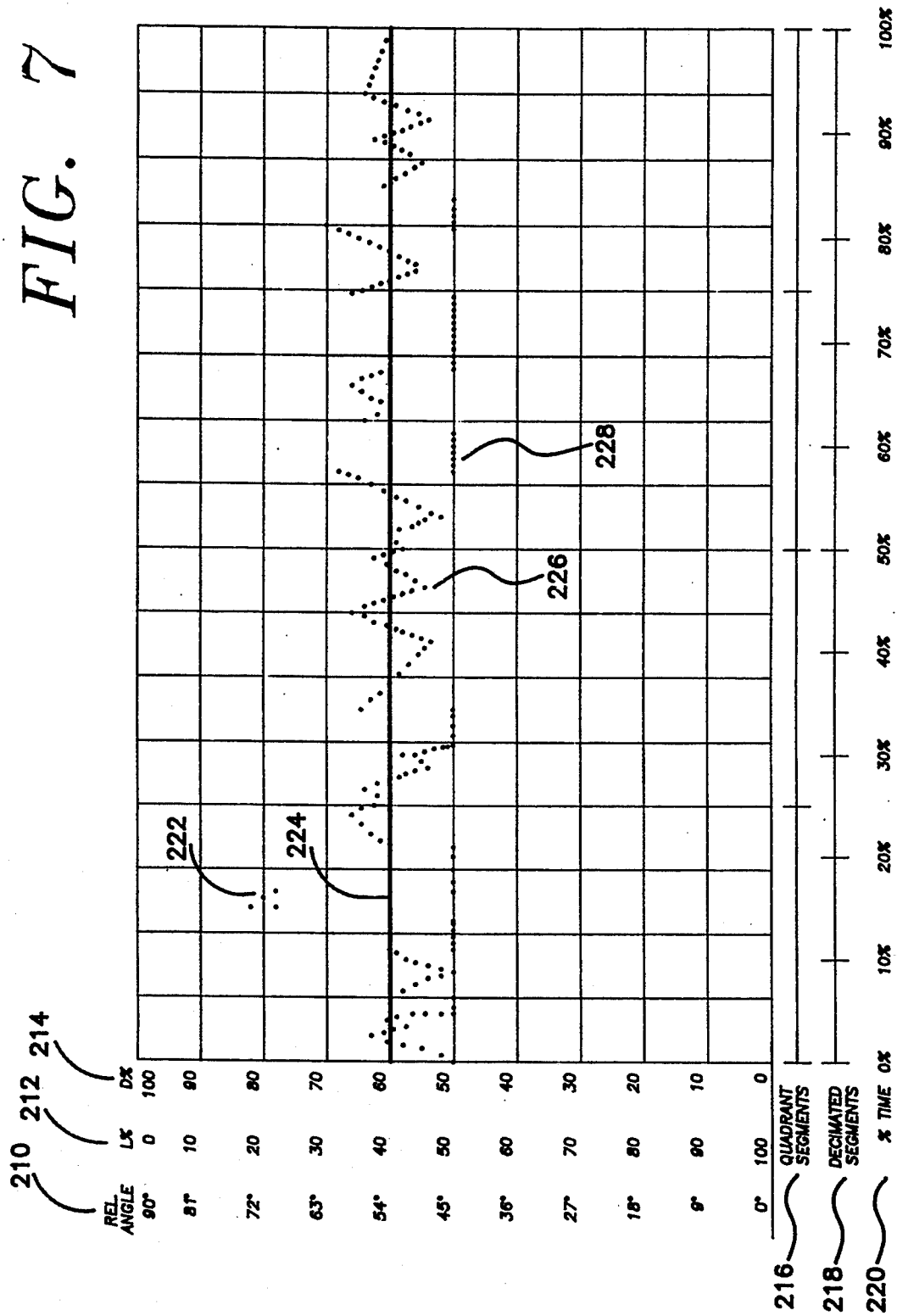
FIG. 7 is a hypothetical chart of a signature using relative angle as the measurement method.

To perform an analysis, the first signature segment would be comprised of the first ten percent of the signal if segmentation were done into ten parts. This decimation of a signal 218 is indicated in FIG. 7. Quadratic segments 216 are also indicated in FIG. 7, each segment being one quarter of the signal. The average relative angle 224 is the average for the entire signal and will not, in most instances, be identical to individual segments. The relative angle of digitized sample points (indicated by the dots in FIG. 7) for the first decimated segment 218 will be different than the relative angle of the first quadratic segment 216. This difference is caused in part by the high direct pressure digitized sample points 222 which resulted, in this example, by the dotting of an "i" in a signature. Thus, the first segment would then be examined to determine the average relative angle of that segment alone. Then a comparison is made between the relative angle of the first segment and the relative angle of other segments and the signature as a whole. In addition, many other comparisons are made based on the possible mathematical combinations. Each specific comparison made defines a measurement point. Large numbers of measurement points can be extracted by comparing various types of segments to the whole and to each other (mathematical combinations) and comparing the relative angle differences, or other statistics (like the range in a segment, or segment cluster measures) applied to the ratio of the direct to the lateral forces.

In one specification of measurement based on the relative angle ratio (RA), comparisons of one segment to another, and to the whole, are made. A difference measurement is calculated, representative of a variation in the signal, called a measurement point value. It is critical to note that the ratio of direct and lateral forces is the electronic indicator of the angle of the pen, not a precise measurement for the angle. Pen angle to paper is the useful analogy for data reduction and analysis. This is important because the overall average relative angle, while important for relative measurements, is not the final measure of analysis. Measurement points reflect segment variation around the relative angle irrespective if the relative angle varies from signature to signature. It is the patterned variations around the average that is the identifier of signers.

Figure 3:
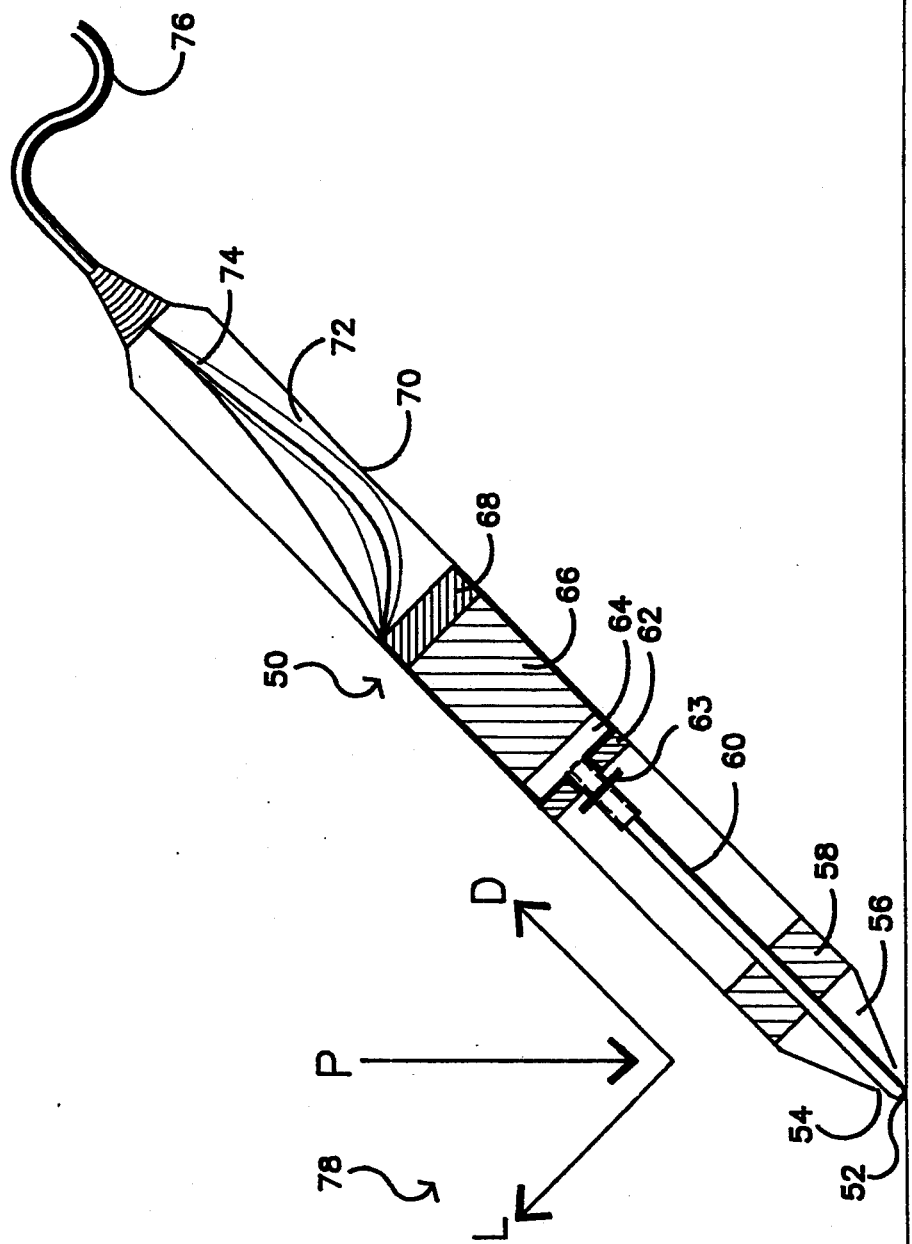
FIG. 3 shows the pressure sensitive data input stylus.

When the stylus is used in a way nearly perpendicular to the surface the "D" or direct pressure predominates. When the pen is slanted greatly approaching being parallel with the surface the "L" or lateral pressure predominates. The two forces taken together always equal the total force applied. The relation of these force vectors to the data input stylus of FIG. 3 is shown in vector force diagram 78. The absolute force downward is treated as a constant rather than as a variable, as in prior art.

If the pen is initially calibrated so that at a 45 degree angle to the surface a downward pressure on the stylus tip measures fifty percent lateral pressure and fifty percent direct pressure, it will be seen that the actual force, no matter how hard or variable, will not affect the essential ratio of the two basic forces. Thus force itself is held as a constant with only the ratio being measured and indicating the angle. This is a critical distinction between the present methodology and earlier conceptualizations of the "z" force as being a variable reflecting variations in downward pressure to be measured. In the same way the lateral pressure does not attempt to make distinctions in direction or acceleration, but is useful only in combination (ratio) with the corresponding direct pressure, combining to create the measurements of variation around the average relative angle which are the essential measurements of this system.

Thus the measures that describe individuals by their signature is not sought in population parameters or complex correlations as in the prior art. The unique signature characteristics are determined by the individual signer as that signer provides a variety of signatures. The enrollment signatures instruct the enrolls to sign in a variety of ways, such as faster or slower, larger or smaller, and harder and softer, in order to make the consistent measurement points and measurement point values stand out more clearly in the analysis.

Recent increases in computer speed allow very large numbers of segment comparisons to be made inexpensively and quickly. Of the large number of measurement points examined by the computer, a smaller number will be consistent and relatively unique for that signer. These areas of consistency provide the simple, relatively invariate, unique measures for signature verification. The resulting small number of specific measurement points (MPs) that identify an individual are called the signature verification discriminates.

Once the specific discriminates have been identified in the enrollment process, the verification procedure is greatly simplified by extracting only these values needed for comparison from the incoming signals for comparisons to the reference standards. Parameters are also easily adjusted as conditions dictate.

FIG. 3 shows the structure and internal components of data input stylus 50. Stylus housing 70 is substantially tubular, housing components which are substantially cylindrical. Stylus housing 70 has an opening at one end for the writing tip 52 of stylus cartridge 60, and at the other end for transducer transmission wires 74 which attach to stylus transmission tether wires 76. Stylus tether wires 76 and transducer wires 74 supply electricity to direct pressure transducer 66 and transmit electric signals out of data input stylus 50. Stylus tether wires 76 and transducer wires 74 also supply electricity to lateral pressure transducer 58 and transmit electric signals out of stylus 50. Stylus housing 70 is composed of metal or durable plastic.

The pressures sensed while writing with data input stylus 50 originate in writing tip 52 as a signature is signed on a writing surface. The downward pressure of writing is indicated in vector force diagram 78 where "P" is handwriting pressure downward on the writing surface with data input stylus 50. In response to handwriting pressure two pressures are measured in the stylus, the lateral, or "L" pressure, and the direct, or "D" pressure, indicated in vector force diagram 78.

Writing tip 52 is part of the stylus cartridge 60 which is movable in response to handwriting pressures. In this embodiment stylus cartridge 60 is a ball point pen refill cartridge which is replaceable. Stylus cartridge 60 is movable, within predetermined limited range of motion, in two ways. First, direct pressure is registered through stylus cartridge 60, and transferred through direct pressure plunger piece 64, which is also movable axially within a predetermined range. Plunger piece 64 presses against direct pressure transducer 66 producing electrical signals proportional to variations in direct, axial pressure.

Excessive direct pressure against transducer 66 is prevented by plunger stop ring 63 attached to tubular portion of plunger piece 64. Stop ring 63 comes in contact with retainer ring 62 at maximum allowable pressure on transducer 66. Retainer plug 68 is attached to the interior surface of stylus housing 70 and holds direct pressure transducer 66 in place. Retainer ring 62 is secured to the interior of stylus housing 70. Plunger piece 64 is held in place by having the disc portion contiguous with transducer 66 on one side, while the other side is contiguous and held in place by retainer ring 62. Retainer ring 62 has a center hole through which passes the tubular portion of the direct pressure plunger piece 64. The tubular portion of direct pressure plunger piece 64 passes through the center hole of retainer ring 62 and secures stylus cartridge 60. The tubular portion of plunger piece 64 is of a larger diameter than stylus cartridge 60 so that limited lateral motion of stylus cartridge is permitted at the writing tip 52. Stylus cartridge 60 snaps into plunger piece 64 at the base so that the stylus cartridge will not fall out of stylus housing 70, yet limited lateral movement is permitted.

Writing tip 52 and stylus cartridge 60 are also movable laterally in response to handwriting pressures. Lateral pressure is transferred through stylus cartridge 60 as sideways pressure against lateral pressure transducer 58. Transducer 58 measures only one force, sideways, irrespective of direction. Transducer 58 is molded to surround stylus cartridge 60 but allows sufficient clearance so that the axial movement of stylus cartridge 60 is possible. Another embodiment uses a pressure sensitive pad, attached to the interior of stylus housing wrapped around interior of stylus housing 70, but not restricting the axial movement of stylus cartridge 60.

Transducer 58 is secured to the interior surface of stylus housing 70. The exterior surface of stylus cartridge 60, and the interior circumference of lateral pressure transducer 58, is composed of a low friction material to allow axial movement even when stylus cartridge 60 is in contact with lateral pressure transducer 58 when writing.

Nose piece 56 is removable allowing access to the interior of stylus housing 70. The hole in the tip of the nose piece, stylus tip opening 54, allows the stylus cartridge to pass through the stylus housing 70. Stylus tip opening 54 is of a predetermined diameter so as to prevent excessive lateral pressure against lateral pressure transducer 58 by limiting the lateral movement of stylus cartridge 60 to a predetermined lateral range of motion.

Lateral pressures against lateral pressure transducer 58 by stylus cartridge 60 during writing relay electrical signals proportional to pressure from lateral pressure transducer 58 through transducer transmission wires 74, through stylus transmission tether wires 76, to signal processing means.

In a like manner direct pressures against direct pressure transducer 66 relays electrical signals proportional to pressure from direct pressure transducer 66 through transducer wires 74, through stylus tether wires 76 to signal processing means.

Empty section 72 of the data input stylus provides room for electronic equipment, as miniaturization progresses, but such equipment is not part of this patent. Another embodiment allows larger transducer means to occupy the empty section 72

Figure 4:
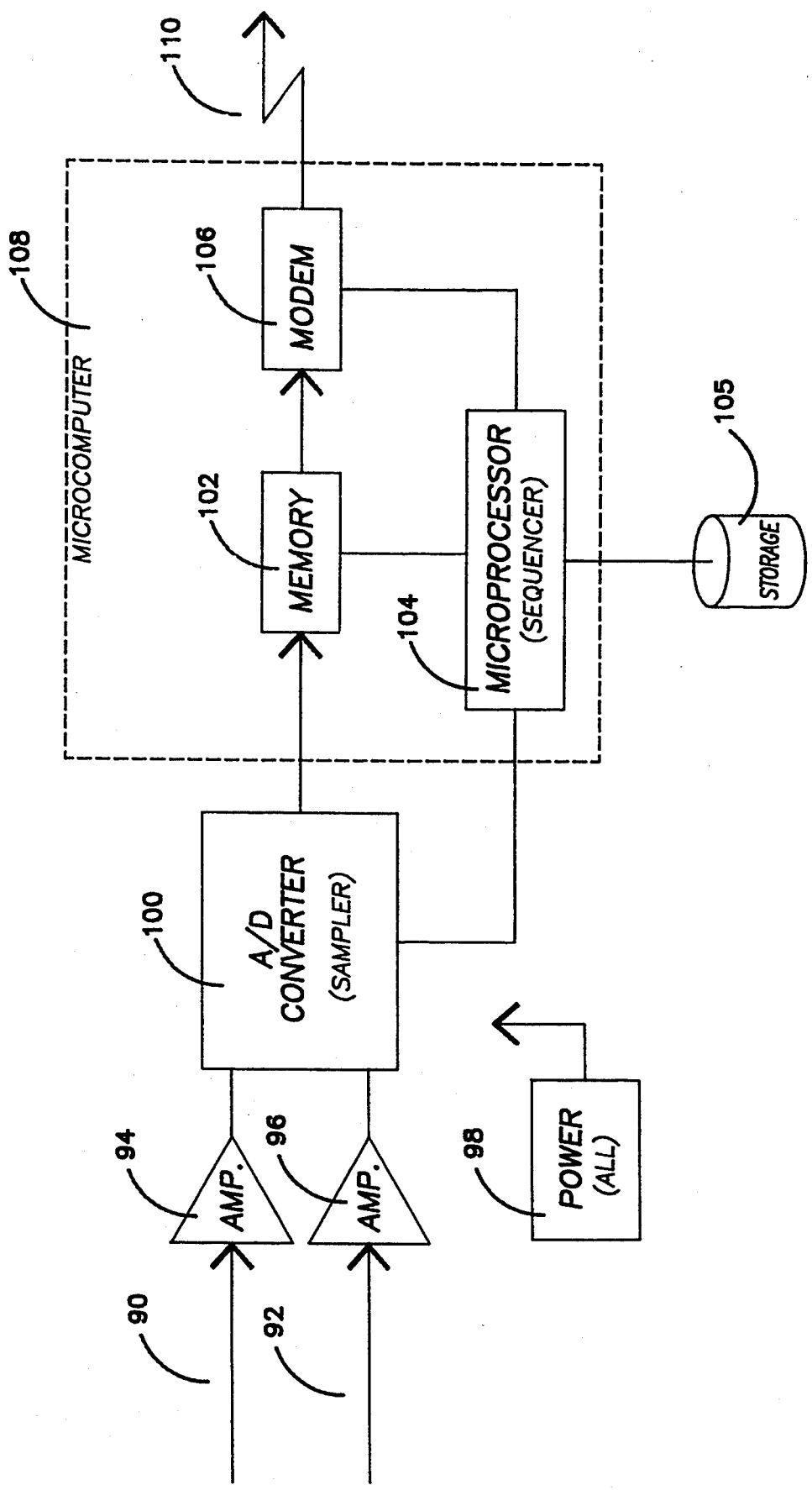
FIG. 4 shows a signal processing unit diagram.

FIG. 4 diagrams the signal processing unit which receives signals from the pressure sensitive data input stylus 50 shown in FIG. 3. Signals produced in data input stylus 50 enter the signal processing unit from direct pressure signal train input 90, and lateral pressure signal train input 92. The inputs arrive by way of stylus tether wires 76 of data input stylus 50 shown in FIG. 3.

In FIG. 4 direct pressure transducer signal trains from stylus arrive at direct pressure signal input 90 and are amplified by the direct pressure amplifier 94. Lateral pressure transducer signal trains arriving at lateral pressure signal input 92 are amplified by the lateral pressure amplifier 96

At analog/digital converter 100 both arriving signals are sampled by the process of being digitized. Digitized signals are used in the system from this point forward. The digitized signal trains then are processed and operations sequenced by microprocessor/sequencer 104. In the preferred embodiment the computer memory 102, microprocessor 104, modem 106, and computer storage 105 are comprised of a microcomputer 108. In this embodiment signal inputs 90 and 92, analog/digital converter 100, and power pack 98 comprise a peripheral device for an existing microcomputer 108. In this embodiment the signal processing unit is linked to the central enrollment and verification computer at a distant location. The phone transmission link 110 allows sequencer to receive instructions from the central computer during enrollment algorithm procedures (FIG. 5 A–B) and during the verification algorithm procedures (FIG. 6).

In a second embodiment all of the components in FIG. 4 are contained in a signal processing unit. Power pack 98 supplies electricity to all components and is plugged into standard AC current.

Modem 106 sends digitized signal trains to a central verification and analysis center via phone transmission 110. But in a second embodiment parameters for verification are held in storage 105 while analysis of enrollment signatures still takes place at a central location via phone 110.

Modem 106 allows digitized signal trains to be sent to a central location and allows accept or reject messages to be sent back to the local verification station where the signal processing unit is located. The signal processing unit is also used to collect reference signatures for analysis and to transmit these signatures to a central analysis center where computer programs (FIG. 5 A–B) are used in the analysis of signal trains and the establishment of specific electronic signature discriminates for individual signers.

Figure 5A:
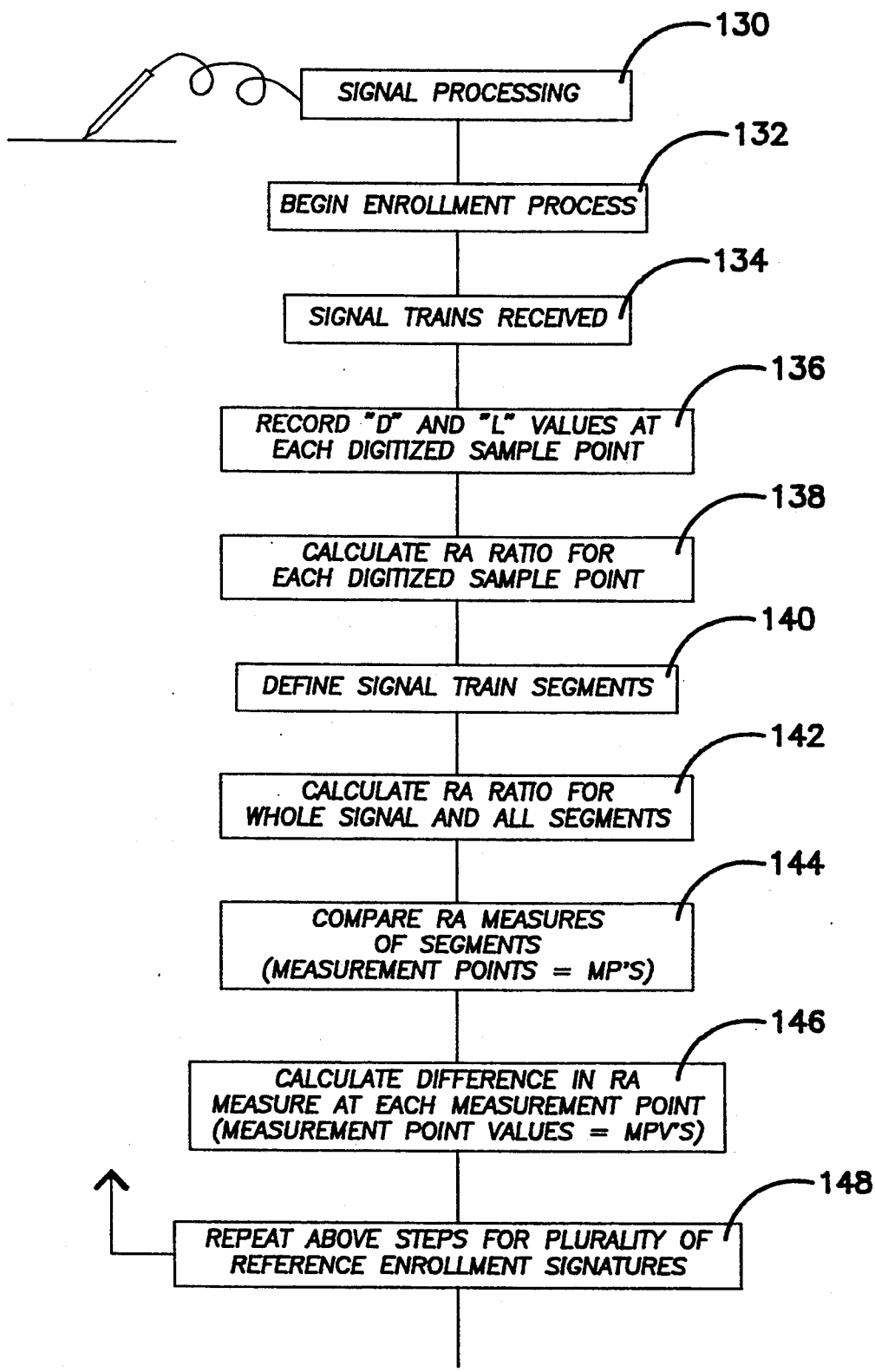
FIGS. 5A and 5B show a flow-chart indicating a computer algorithm for the signature enrollment process.
Figure 5B:
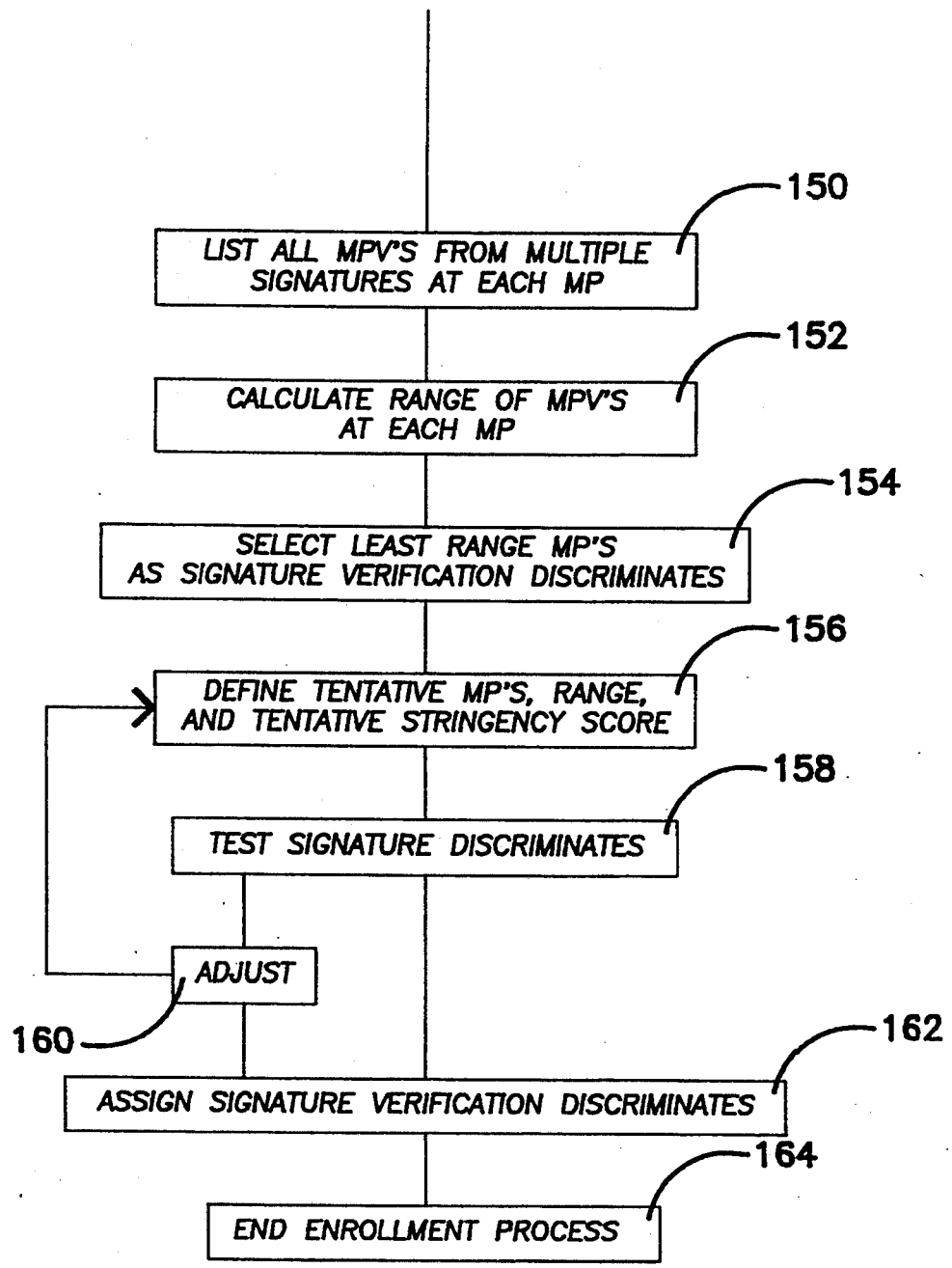
Figure 6:
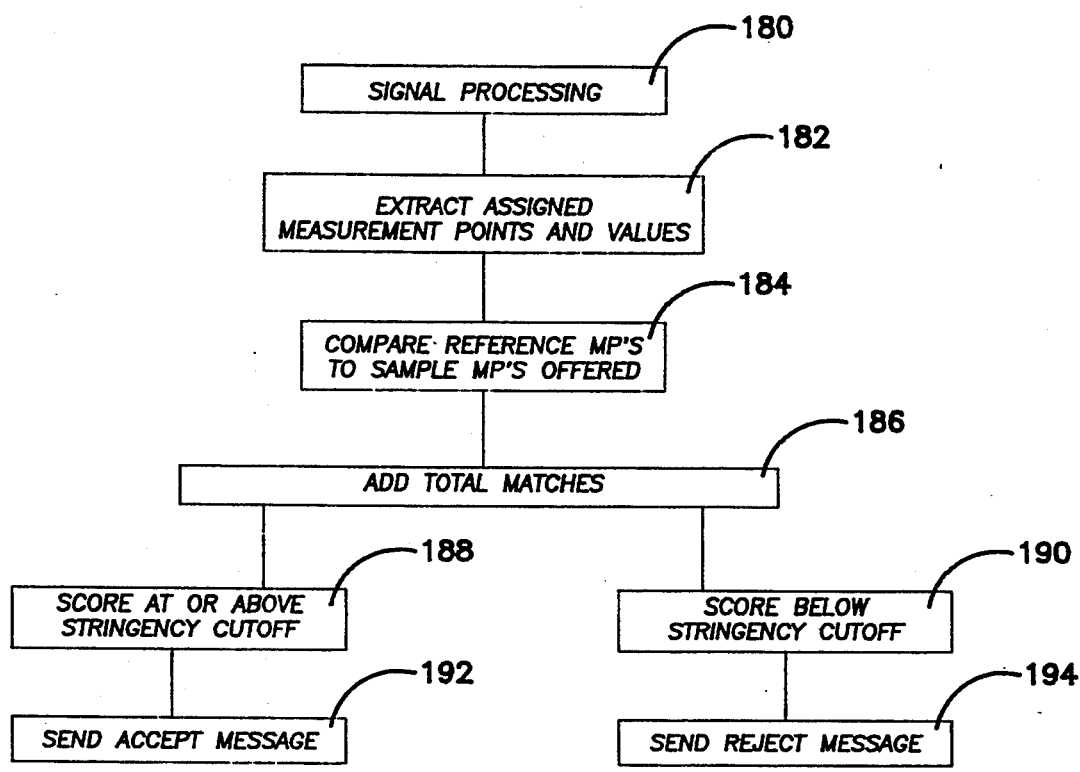
FIG. 6 is a flow-chart indicating a computer algorithm for the signature verification process.

FIG. 5, A–B is a flow chart describing a computer algorithm used as a method for enrolling reference signatures in a signature verification system. The first step 130 provides signal trains to a central computer location originating when an enrolls uses the data input stylus shown in FIG. 3 to provide enrollment signature signals which are processed by machine method shown in FIG. 4. The data input pen shown in FIG. 3, and the signal processing device shown in FIG. 4, are used in the system to produce and transmit reference signatures as well as signatures to be verified at a later time. The enrollment process begins in the second step 132 as the process is initiated by the central computer and relayed to microprocessor 104 of the local signal processor. Digitized signals arrive via phone for analysis at a central computer 134.

The enrollment procedure requires an enrolle to use the data input stylus when signing twenty enrollment signatures. An enrollment form, used in the beginning of the enrollment process 132, indicates how the signatures are to be signed by the enrolle: faster vs slower, larger vs smaller, harder vs softer, and the resulting combinations of the above. These combinations result in requests for signatures signed in the following ways: fast/hard, fast/large, fast/small, fast/soft, slow/large, slow/small, slow/hard, slow/soft, large/hard, large/soft, small/hard, and small/soft. In addition to these specific signing instructions, the enrolle is asked on the form to provide eight additional normal signatures.

In the third step 134 the signals are received and stored at the central analysis location. Each signal train, representative of a signature, is treated separately during analysis.

The fourth step 136 records the direct pressure amplitude and the lateral pressure amplitude for each digitized sample point in the signal train. Digitization used for sampling involves a sampling rate in the range of 100 samples per second, so an average signature will consist of approximately 500–800 sample points and the accompanying values of direct and lateral pressure. There is, however, no need for a maximum allowable time to sign an enrollment reference signature.

The fifth step, 138 calculates the ratio of the direct pressure signal amplitude to the lateral pressure signal amplitude at each sample point. This standardizes amplitude as a ratio for further calculations. The resulting values are known as the relative angle ratios.

When the relative angle ratios have been calculated for all digitized sample points the analysis shifts to calculations involving the duration of the signal trains and the division of the signal train into parts, or segments.

The sixth step 140 divides the signal trains into equal part segments for analysis. The signal train is divided into quadrant segments, each segment being 25 percent. The same signal is then divided into decimated segments, each segment being 10 percent of the signal train. The signal train is then divided into twenty five segments, each being 4 percent of the signal train. And finally, the signal is divided into 50 parts, each segment being 2 percent of the signal train. This process is not limited to the segment divisions listed, and, if more segments are needed in the analysis, other kinds of segments can be defined and the signal train divided in other ways. The resulting segments are defined by the sample points and the values of the sample points falling within them.

The sixth step 140, defining segments, converts signal train durations to relative measures as each complete signal train is considered one hundred percent of the signal train, no matter how long, and then divided on that basis.

Having defined segments and assigned sample points and their ratio values to each segment, various calculations can be made for each defined segment. The seventh step 142 averages the amplitude ratios of sample points within each segment, and averages the ratio points for the entire signal train. This results in each segment having a relative angle measurement as well as the whole signal train having a relative angle measurement. The relative angle of the entire signal train might well vary between signal trains from the same signer, so the overall relative angle is not used as a discriminate. However, the relative angle of the entire signal is useful as the average around which the segment relative ratios fluctuate. The unique nature of some of these fluctuations for an individual signer form the basis of the signature discriminate measures.

The eighth step 144 compares all segment measurements to each other. Each segment is compared to each other segment in all possible mathematical combinations. When the signal train has been divided into four segments, ten segments, twenty five segments, and fifty segments, this results in eighty nine defined segments. There are 3,916 possible combinations of two segments, or comparisons, that can be made. Each comparison is called a measurement point. The number of measurement points needed is a variable depending on computer speed and comprehensiveness of analysis desired. By adding an additional segmentation to the above defined segments of seventy five segments, the total number of segments would then be the original eighty nine plus seventy five which equals one hundred and sixty four segments. The number of combinations thus increases to 13,366 combinations, or measurement points.

Additional measurement points can also be created by simply combining numbers of segments and treating the combination as one new segment. The number of possible combinations, and therefore the number of new measurement points, increases greatly when this method is used. There is no practical limit to segment definition and creation.

The ninth step 146, measures comparisons at each measurement point. Since each segment has a relative angle measurement, the difference in relative angle at a measurement point results in one measurement point value. If one hundred and sixty four defined segments were analyzed, as in the above paragraph, the 13,366 measurement points would have 13,366 measurement point values defining the signal train of the signature.

Step ten 148 repeats the above calculations for each of the twenty enrollment signature signal trains. Each signal train is analyzed individually, but each measurement point is assigned the measurement point values from all signals.

The second phase of the analysis of reference signatures is diagramed in FIG. 5-B. The first step 150 of phase two lists all of the measurement point values (MPV's) obtained from the reference signatures for each measurement point (MP).

The second step 152 calculates the range of values obtained at each measurement point from the twenty signatures.

The third step 154 selects a smaller number of measurement points having the lowest ranges, in this case 500 measurement points, to serve as tentative signature verification measurement points.

The fourth step 156 defines the selected low-range measurement points and their range of acceptable values. The range of acceptable values is simply the range of scores obtained at a given measurement point during enrollment. A tentative stringency score consists of the number of measurement point matches a sample signature must achieve to be verified. The tentative stringency score need only be an educated guess, based on other similar ranges of measurement points, prior to testing.

The fifth step 158 consists of testing the tentative measurement points and stringency score using actual signatures provided for the purpose by the enrolle. Here the phone link between the central analysis computer and the local signal processor is again used. A signature signal train is sent via phone lines to the central analysis center in order to test the tentative signature discriminates.

The sixth step 160 is to adjust the stringency score and the ranges of the measurement points if necessary, to balance the probability of false rejections of the true signer against the probability of false acceptance of a false signer. The enrolle can have some discretion in the decision about this balance based on the needs of the enrolle. In fact, a variety of stringency scores can be employed for one signer depending on the importance of the signature. For example, a lower stringency score for credit card purchases under one hundred dollars is possible. Thus the possibility of false rejection is decreased because the importance of the transaction is less serious. Extremely important signings might have an extremely high stringency score.

The seventh step in the second phase of the enrollment process 162, assigns the chosen measurement points, and their acceptable range of values to the individual enrolle. The chosen values are known as the signature verification discriminates. A second embodiment allows the signature verification discriminates now identified, to be relayed back to the storage capacity 105 of the signal processing unit. This allows the parameters for verification to be kept at the local level, if this is desirable in a particular application.

The eighth step 164, ends the enrollment process.

FIG. 6 is a flow chart describing a computer algorithm used as a method for signature verification, when enrollment signatures have been processed as shown in FIG. 5 A-B, and are on file.

The first step, 180 consists of a putative signer providing a signature with the data input stylus shown in FIG. 3, and the resulting signal trains amplified, digitized, and transmitted for analysis as shown in FIG.4

The second step 182 in signature verification involves the distant central computer extracting, from an incoming signal train of a signature, only the values of the measurement points previously chosen to be signature verification discriminates.

The third step 184 in signature verification compares the extracted measurement point values of the putative signature with the allowable range of values on file as the signature verification discriminates.

The fourth step 186 in signature verification consists of adding the number of matches achieved by the incoming signals.

If the number of matching points is at or above the predetermined stringency cutoff 188, an accept message 192 is sent. If the number of matching points is below the predetermined stringency cutoff 190, a reject message 194 is sent.

Not shown in FIG. 6 is the possible additional step of setting another score which, being close to the stringency cutoff, allows the putative signer to try again. This feature could help avoid false rejections of signers whose signature tended to change slightly over time. Consistent automatic fine tuning of signature discriminates is thus easily done as the system is used for verifications.

Another step not shown in FIG. 6 is the possibility of ongoing signature verification procedures indicating new measurement points which should become discriminates, and indicating current discriminates which are becoming less useful over time.

FIG. 7 is a graphic representation of a hypothetical signature plotted so as to indicate how the signal trains are related and analyzed. The vertical axis of the chart indicates the angle of the stylus relative to the writing surface, the relative angle 210. The relative angle is actually measured by the ratio of the direct and lateral pressures, also indicated along the vertical axis 212. This chart assumes a data input stylus of the type described herein calibrated so than downward pressure on the stylus tip when the stylus is at a 45 degree angle to the writing surface, registers 50 percent direct pressure 214 and 50 percent lateral pressure 212.

It is the ratio of the direct pressure to the lateral pressure which is actually measured and is correlated to an angle degree for clarity. Actual variations in pressure on transducers is eliminated as a variable by measuring only the relationship, that is the ratio, of the two pressures measured.

The horizontal axis of the chart in FIG. 7 indicates the duration of the signal train. But the final measure used is also standardized so that the whole signal train is 100 percent, no matter how long it actually is. Thus, actual duration is also eliminated from final calculations in favor of relative measures. This is important since variation in duration, as in amplitude occurs in different signatures of the true signer and is an inadequate discriminate measure.

The total signal train being 100 percent of itself, is then divided into equal parts called defined segments based on a percentage of the signal. The segments are defined as simple parts of the whole, the whole being one hundred percent 220. Quadrant segments 216 are made by dividing the signal train into equal quarter segments of twenty five percent each. Decimated segments 218 are defined by dividing the signal train into ten equal parts of ten percent each. The process of creating defined segments is not limited to the several indicated in FIG. 7 since the signal can be divided into 100, 20, 80, or any number of segments for analysis. In practical terms, only a few segment divisions are necessary for analysis since a large number of mathematical combinations result from a relatively small number of comparison units.

The plotted digitized sample points 226 in FIG. 7 represent the measurement of ratio between the direct force of the signal train and the lateral force of the signal train. The sum of the plotted points in FIG. 7 represent the digitized signals of a complete signature where the pen was lifted from the paper seven times, leaving eight natural segments of pen-down times. The pen-up times 228 are indicated in the chart as lying along the line where direct and lateral pressures are equal, which is the same as the 45 degree measurement. Pen-up times could also be represented as no signal at all, but this distinction is minor since these natural segments, which play a major role in much prior art, are eliminated from the analysis in the present system. Rather, segmentation, which is necessary, is achieved by simply dividing the signal trains into defined segments, being equal parts of the whole. Since the analysis of variation is problematic of any given digitized point in itself, comparisons are made of segments of varying lengths. For example, the first segment of the quadrant segments 216 could be compared to the first decimated segment 218 in terms of the average of the plotted points within the segments. It will be seen that the first quadratic segment will have more points of a higher relative angle than the first decimated segment, thus the average, not the total points, will be different. The comparison of two segments yields a measure of their difference, the measurement point value. The average of all plotted points in a signature is the relative angle 224 of the whole, which in this hypothetical chart, is 54 degrees, or a 40/60 ratio of direct to lateral force. The average of the whole is, however, a variable itself, since a signer might hold the stylus in different ways at different times owing to environmental conditions or other factors. Thus, this measure also is standardized, by examining the measurement point values as they vary around a given average. The actual measure of the average angle is not used as a discriminate.

SUMMARY, RAMIFICATIONS, AND SCOPE

Accordingly, the reader will see that the Signature Verification System disclosed makes possible less expensive, more durable, less complicated, and more reliable signature verification. This is possible because the data input device and the resulting data analysis is fundamentally different from previous signature verification systems. The simplified and more durable stylus along with the simplified and adaptable algorithm make use in a variety of settings practical. Use is not restricted to credit card point of sales since the stylus is easily adaptable to use as a computer peripheral at a remote location allowing access by identification in a safer way than code words or numbers.

The algorithm disclosed for use with the simplified and unique stylus also has a number of advantages allowing widespread applications:
1. The calculations required are simple and fast.
2. The enrollment takes advantage of individual variations, rather than treating this as a problem.
3. After enrollment, verification is exceptionally fast and accurate.
4. Stringency requirements are easily adjusted to conditions.
5. Resulting signals do not need manipulation based on how the user holds the pen.
6. Verification is not dependent on consistent signing.

Although the description above contains many specificities, these should not be construed as limiting the scope of the invention but as merely providing illustrations of some of the presently preferred embodiments of this invention. For example, the pressure sensitive transducers contained in the stylus might consist of pressure sensitive film, pressure sensitive resistors, or any number of pressure sensitive devices small enough for the purpose. Similarly, the enrollment algorithm might make use of a variety of standard statistical measurements applied to the developed measures of relative angle in order to derive additional measurement points. Also, the device might also be useful in a variety of settings where personal identification is useful such as providing a legal signature transmitted electronically, or serving as the identification means for access to restricted areas.

Thus, the scope of this invention should be determined by the appended claims and their legal equivalents, rather than by the examples given.

I claim:

1. A pressure sensitive data input stylus particularly configured for use with an electronic signature verification system wherein indicators of the angle of the stylus in relation to a writing surface, and variations in said indicators, are used as the identifying discriminate, the device comprising:
  (a) a stylus housing with an elongated body, substantially cylindrical, and having a longitudinal axis;
  (b) a stylus cartridge mounted within said stylus housing along the longitudinal axis thereof, the stylus cartridge terminating at one end in a writing tip, and terminating at the other in a bearing surface in contiguous relation with a first transducer means sensing axial pressure from said writing tip produced while writing with the stylus on said writing surface, the axial pressure hereafter being known as a direct pressure;
  (c) a second transducer means surrounding said stylus cartridge near the writing tip, secured to interior of said stylus housing, having sufficient clearance to allow axial movement of said stylus cartridge, while sensing pressure transmitted through the stylus cartridge transverse to said direct pressure, the transverse pressure hereafter being known as a lateral pressure;
  (d) said first transducer means mounted axially within said stylus housing so as to produce a direct pressure signal that increases in proportion the transverse pressure as the stylus angle becomes more nearly perpendicular to said writing surface when stylus tip is in contact with said writing surface while writing;
  (e) said first transducer means producing a direct pressure signal that decreases in proportion to the transverse pressure as the stylus angle becomes more nearly parallel to said writing surface when stylus tip is in contact with said writing surface while writing;
  (f) said second transducer means mounted within said stylus housing around the stylus cartridge so as to produce a lateral pressure signal that increases in proportion to the transverse pressure as the stylus angle becomes more nearly parallel to said writing surface when stylus tip is in contact with said writing surface while writing;
  (g) said second transducer means producing a lateral pressure signal that decreases in proportion to the direct pressure signal as the stylus angle becomes more nearly perpendicular to said writing surface when stylus tip is in contact with said writing surface while writing;

(h) said first transducer means and said second transducer means positioned in said stylus housing so that they produce inversely correlated signal strengths as the angle of the stylus changes relative to said writing surface during writing;

(i) a first signal transmission means for conveying a first signal train produced by said first transducer means from stylus to a signal processing means, and a second signal transmission means for conveying a second signal train produced by said second transducer means from stylus to said signal processing means.

2. The invention as defined in claim 1 wherein the stylus cartridge is comprised of a ball point pen refill cartridge removably mounted within said data input stylus.

3. The invention as defined in claim 1 wherein the stylus cartridge tip is comprised of a non-writing point, whereby pressure signals are relayed without leaving visible marks on said writing surface.

4. The invention as defined in claim 1 wherein signal trains generated within the stylus are transmitted by wires from the stylus to signal processing means, whereby the stylus serves as a peripheral input device for a microcomputer.

5. The invention as defined in claim 1 wherein said signal trains generated by the transducers are transmitted by wires from said data input stylus to signal processing means including amplification means, digitization means, memory means, microprocessor means, transmission means, and modem means, whereby the invention serves as a signature verification and enrollment transmission and receiving station, whereby said signal trains are transmitted by telephone means to a central verification and enrollment location and whereby a verification message or a rejection message is sent from the central location to the local transmission and receiving station.

6. The invention as defined in claim 1 wherein the signals generated by the transducers are transmitted by wires from said data input stylus to amplification means, digitization means, memory means, transmission means, microprocessor means, and storage means for verification data, whereby the invention serves as a signature verification system at the local level, storing signature verification parameters originally generated by a central verification and enrollment center at time of enrollment.

7. The invention as defined in claim 1 wherein the first singular transducer means is located neap the center of the stylus to sense direct pressures exerted upon said stylus cartridge and the second singular transducer means is located near the writing tip in order to sense lateral pressures exerted upon said stylus cartridge within the stylus.

8. The invention as defined in claim 1 wherein said data input stylus provides identifying signals used in a peripheral input device for a microcomputer, whereby a person can provide an electronically transmittable signature as identification required for computer access.

9. The invention as defined in claim 1 wherein the stylus is used to provide identifying signals, whereby access to restricted areas is controlled.

10. The invention as defined in claim 1 wherein the lateral transducer means is a singular transducer producing a singular signal irrespective of the direction of radial force from said stylus cartridge against said transducer means, whereby the rotational position of the stylus with respect to the writer's grip has no effect requiring manipulation of data from the resulting signal train.

11. The invention as defined in claim 1 wherein said stylus cartridge is physically restricted in axial movement to a predetermined range with a retainer ring stop means, whereby excessive pressure on said first transducer means is prevented.

12. The invention as defined in claim 1 wherein said stylus cartridge is physically restricted in lateral movement by the predetermined diameter of the opening in said stylus housing through which said writing tip exits, whereby a predetermined excessive pressure on said second transducer means is prevented.

13. The invention as defined in claim 1 wherein the outer layer of said stylus cartridge and inner circumfrance of said lateral pressure transducer are comprised of low-friction material, whereby axial movement of the cartridge is facilitated.

14. In a signature verification system, a method for enrolling the reference signatures of individuals comprising the following steps:

(a) measuring incoming digitized electronic signal trains through a signal processing means, said signal trains originating in a pressure sensitive data input stylus with a first transducer means capable of sensing axial pressure, hereafter known as a direct pressure, and a second transducer means capable of measuring pressure transverse to the direct pressure, hereafter known as a lateral pressure said first transducer means producing a first signal train representative of variations in direct pressures on the stylus while signing a signature said second transducer means producing a second signal train representative of variations in pressures lateral to the axis of the stylus when signing a signature, said first transducer means positioned axially within the stylus and the second transducer positioned about the axis of the stylus, the first and second transducers producing inversely correlated signal strengths as the angle of the stylus to a writing surface varies while signing a signature, indicators of said variations forming the verification discriminate;

(b) recording the direct pressure values and the lateral pressure values at each digitized sample point in said signal trains;

(c) calculating the ratio of the direct pressure to the lateral pressure at each sample point, whereby the resulting measurement is a relative measure independent of actual amounts of direct or lateral force representing the physical orientation of the stylus, said ratio hereafter being known as a relative angle ratio;

(d) dividing the incoming signal train into segments of equal length representing the relative angle ratio of the stylus for portions of the signal trains, and repeating this process several times, each segmentation yielding a different number of segments of varying lengths, whereby segments can be compared in order to yield variation measurements, said segments hereafter being known as defined segments;

(e) computing the overall ratio of the direct pressure signals and the lateral pressure signals, being known as the relative angle ratio, for the whole signal and all said defined segments;

(f) comparing the relative angle ratio measurement of said defined segments to each other, and to the relative angle of the whole signal train, in different segment combinations, each resulting comparison hereafter being known as a measurement point;

(g) characterizing angular relationships in the individuals signature by calculating the difference in relative angle measures between the two compared segments at each measurement point, the resulting value hereafter being known as the measurement point value;

(h) repeating the enrollment steps above for a plurality of reference signatures generated by enrolle using said data input stylus;

(i) listing the measurement point values from multiple enrollment signature signal trains at each measurement point;

(j) determining variations in the physical orientation of the individual signature by calculating the range of values obtained from said reference signatures at each measurement point to establish a range of acceptable values for each measurement point, said range hereafter being known as an acceptable range of values, whereby the corresponding measurement value from a putative signature is counted as either a scored point falling inside the range of acceptable values, or a missed point, falling outside the range of acceptable values during a later verification measurement;

(k) selecting a reduced number of least range measurement points, said measurement points comprising the consistent measurement points and range of acceptable variation for each forming the signature identification discriminate;

(l) selecting measurement points for a tentative stringency score, being the number of matched measurement point values required for verification of a putative signature;

(m) testing actual signatures of true signer and adjusting said stringency measure and said range of acceptable values at measurement points in order to maximally balance probability of false rejections and false acceptances;

(n) assigning the final signature identification discriminates to individual enrolle.

15. The invention as defined in claim 7 wherein a plurality of enrollment signatures are obtained requesting variations in signing style including faster and slower signing, harder and softer signing, and larger and smaller signing, and combinations thereof, whereby consistent measurement points are more clearly distinguished when said enrollment reference signatures are compared.

16. The invention as defined in claim 7 wherein the additional step of calculating the statistical measurement of range of the relative angle within segments is used to determine the difference between segments resulting in additional measurement points, whereby additional measurement points are available for signature verification.

17. The method as defined in claim 7 wherein standard statistical procedures are applied to relative angle ratio measures in order to yield measurable differences between said defined segments, whereby additional measurement points and measurement point values are created.

18. The invention as defined in claim 7 wherein the data input stylus, amplification of signals means, digitization means, microprocessor means, memory means, storage means, and modem means are used to transmit enrollment signatures for computer analysis at the time of enrollment.

19. A method for verifying a signature comprising the following steps:

(a) receiving incoming digitized electronic signals from a sample signature produced by a putative signer, through a signal processing means, and originating in a pressure sensitive data input stylus, containing a first transducer means capable of sensing axial pressure, hereafter known as a direct pressure, and producing a first signal train representative of variations in said direct pressure, and a second transducer means capable of measuring pressure transverse to the direct pressure, hereafter known as a lateral pressure, and producing a second signal train representative of variations in pressures lateral to the axis of the stylus while signing, said first transducer means axially positioned inside said stylus and said second transducer means positioned transversely around the axis of said stylus, the first and second transducers producing inversely correlated electronic signal values as the angle of the stylus to a writing surface varies while signing a signature;

indicating said electronic variations in the form of a verification discriminate;

(b) identifying from said first and second electronic signal trains specific reference measurement points and their reference measurement point values for different locations in the signal trains said reference measurement points and the reference measurement point values determined during enrollment of reference signatures by the putative signer, the value of each reference measurement point being a difference between two segments, each segment representing the relative angle of the stylus for a portion of the electronic signal train;

(c) comparing incoming measurement point values for sample signatures with the reference measurement point values from the verification discriminate;

(d) tracking the total number of incoming measurement point values falling within a predetermined allowable range of acceptable values of said reference measurement point values;

(e) sending an accept message if a preselected number of said incoming measurement point values are within the predetermined range of the reference measurement point values; and (f) sending a reject message if a predetermined number of said incoming measurement point values are not within the predetermined range of the reference measurement point values.

20. The invention as defined in claim 19 wherein the reference measurement point values and computer means for comparing said measurement point values with those of a sample signature are housed at a central verification center, transmissions being achieved through a telephone system.

21. The invention as defined in claim 19 wherein the reference measurement point values and computer means for comparing said measurement point values with those of a sample signature are retained in storage of local computer means where verification takes place.

22. The invention as defined in claim 19 wherein ongoing signature verifications provide new information about consistent measurement points, whereby parameters of reference measurement points can continually be updated.

23. The invention as defined in claim 19 wherein said signal trains are received from a remote terminal of a computer system for verification of identity, whereby access is granted or denied to restricted information through said remote terminal.

24. The invention as defined in claim 19 wherein the verification procedure is used to confirm the identity of persons and thereby control physical access to restricted areas.

25. The invention as defined in claim 19 wherein an additional step includes allowing putative signer to try again if the number of matching measurement points is within a predetermined area of proximity to required number for verification.

26. The invention as defined in claim 19 wherein a verified signature transmitted electronically, and meeting predetermined stringency requirements based on measurement points, is considered a legal signature on electronically transmitted documents received by a consenting party.

27. The invention as defined in claim 5 wherein the amplification means is coupled between the data input stylus and the digitization means, the microprocessor means is coupled to the digitization means, the memory means is coupled to both the digitization means and the microprocessor means, and the modem means is coupled to both the memory means and the microprocessor means; and the data input stylus, amplification means, digitization means, microprocessor means, memory means, and modem means analyze enrollment signatures at the time enrollment signatures are being received.

* * * * *